United States Patent [19]

Karecki

[11] Patent Number: 4,786,142
[45] Date of Patent: Nov. 22, 1988

[54] OPTICAL INSTRUMENT LINE OF SIGHT ALIGNING DEVICE

[75] Inventor: Marion R. Karecki, Portland, Oreg.

[73] Assignee: Eyedentify, Inc., Portland, Oreg.

[21] Appl. No.: 874,705

[22] Filed: Jun. 16, 1986

[51] Int. Cl.$^4$ .................. G06K 9/32; G02B 27/00
[52] U.S. Cl. .................................. 350/319; 350/578; 351/208; 356/150
[58] Field of Search .............. 350/578, 319; 351/222, 351/244, 239, 208; 356/399, 138, 150; 382/2

[56] References Cited

U.S. PATENT DOCUMENTS

| | | |
|---|---|---|
| 1,804,749 | 5/1931 | Desmond . |
| 1,990,297 | 2/1935 | McFadden ..................... 351/204 |
| 2,100,940 | 11/1937 | Coleman . |
| 2,326,030 | 8/1943 | Hearn . |
| 2,712,139 | 7/1955 | Kelly . |
| 3,012,472 | 12/1961 | Feinberg et al. ............... 351/222 |
| 3,064,528 | 11/1962 | Gelatt . |
| 4,027,954 | 6/1977 | Good ............................. 351/222 |
| 4,059,347 | 11/1977 | Eitel . |
| 4,109,237 | 8/1978 | Hill ................................ 382/2 |
| 4,393,366 | 7/1983 | Hill ................................ 382/2 |
| 4,452,515 | 6/1984 | Lewis ............................ 351/222 |
| 4,575,946 | 3/1986 | Bommarito . |

OTHER PUBLICATIONS

"School Vision Tester", Titmus Optical Co., 6 pages.

Primary Examiner—Jon W. Henry
Attorney, Agent, or Firm—Eugene D. Farley

[57] ABSTRACT

A line of sight aligning device for use with an optical instrument having a viewing opening requiring precise alignment with the line of a sight of the viewer. The device comprises a body member having an eye opening and nose recess in operative position relative to each other. Positioning means position the body member relative to the optical instrument with its eye opening aligned with the viewing opening of the optical instrument. On the front face of the body member, above the nose recess, is a straight edge positioned within the field of vision of the viewer and disposed substantially at right angles to the longitudinal axis of the nose recess in the body member. A pad member, preferably integral with the straight edge, also is positioned in both the nose recess for use as a head rest by looking through the eye opening of the device into the viewing opening of the optical instrument while positioning his head in such a manner that the straight edge is substantially normal to the longitudinal axis of his nose, the viewer is enabled to align his line of sight precisely with that required for proper use of the optical instrument.

7 Claims, 1 Drawing Sheet

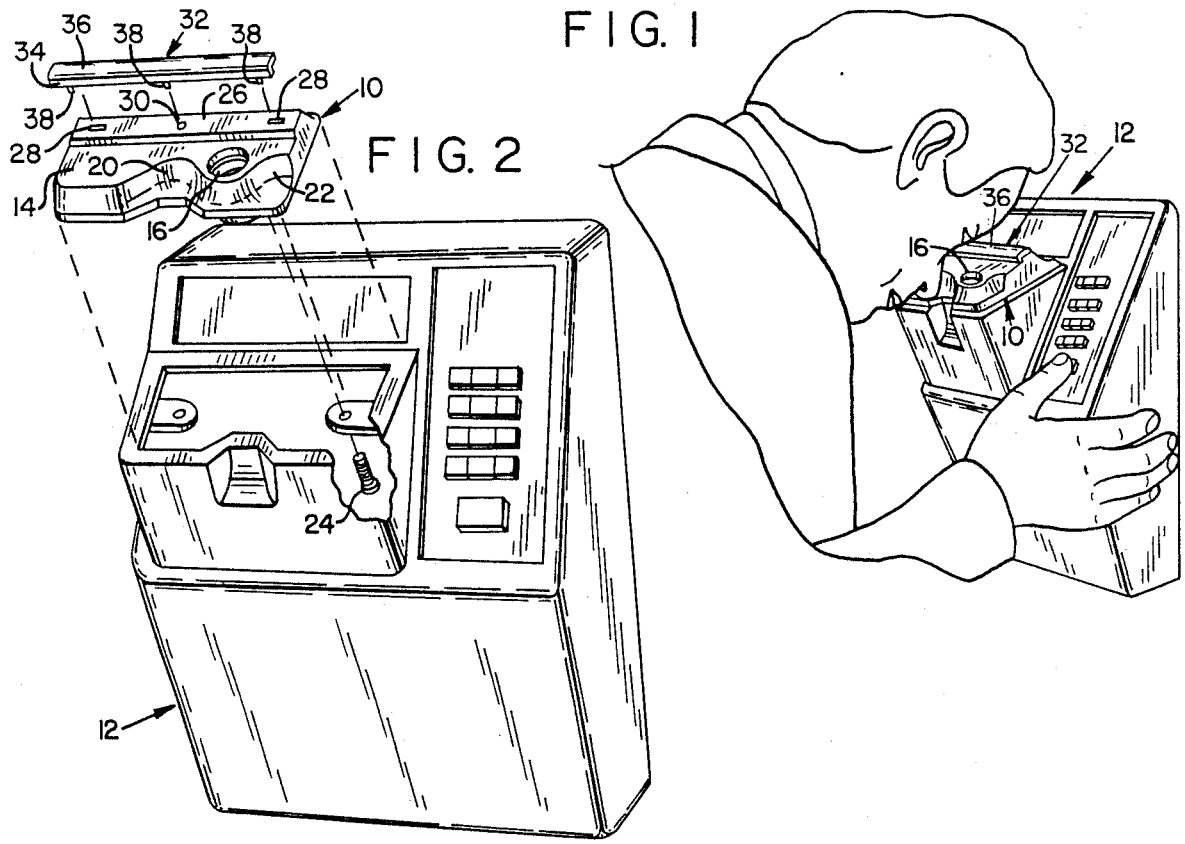
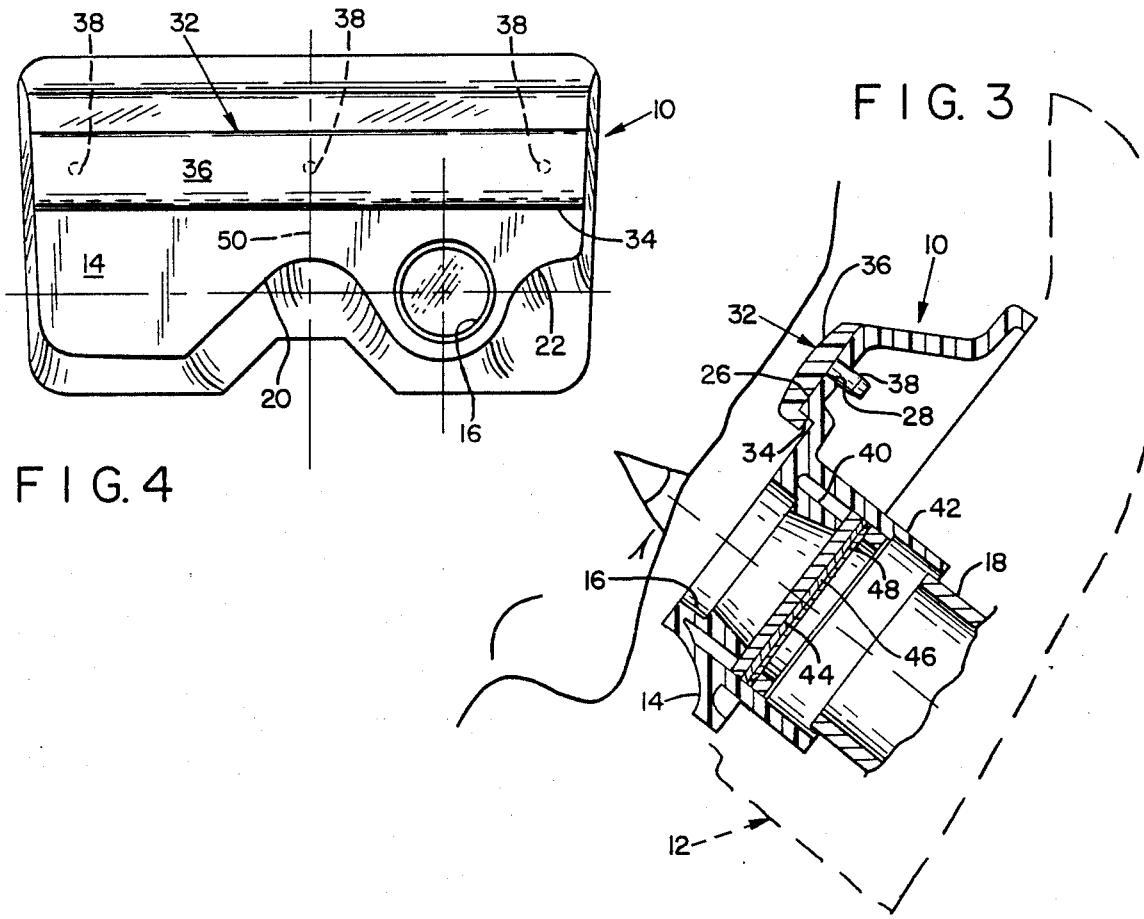

OPTICAL INSTRUMENT LINE OF SIGHT ALIGNING DEVICE

BACKGROUND AND GENERAL STATEMENT OF THE INVENTION

This invention pertains to line of sight aligning devices for use with optical instruments having viewing openings requiring precise alignment with the line of sight of the viewer.

In the field of optics, there are many optical instruments which require for their proper and accurate use precise alignment of the line of sight of the viewer with a viewing opening in the instrument. This is the case, for example, in Hill U.S. Pat. Nos. 4,109,237 and 493,366 both of which pertain to apparatus and method for identifying individuals through their retinal vasculature patterns. The apparatus employed directs a beam of light into the eye of the subject and reads the retinal vasculature pattern from the reflected light. The resulting information then is used for identification of the subject.

In this sequence, it is imperative that the line of sight of the subject be located precisely with respect to the analyzing instrument in order to obtain reproduceable results.

Without mechanical assistance, precise location inherently is difficult of achievement. It is difficult for a viewer, unassisted, to align his eye precisely with the viewing opening of an instrument. The problem is complicated by the reluctance of the viewer for sanitary reasons to place his eye in direct contact with an eye piece. Such contact is further undesirable since female viewers smear mascara and eyeshadow over the contacted portion of the eyepiece.

It accordingly is the general purpose of the present invention to provide a line of sight aligning device for use with optical instruments having viewing openings requiring precise 10 alignment of the line of sight of the viewer.

It is a further object of the present invention to provide a line of sight aligning device which is simple, easy to use, usable in conjunction with a wide variety of optical instruments, and accurate.

A further object of the present invention is the provision of line of sight aligning apparatus which achieves its purpose without requiring contact of the eye of the viewer with an eyepiece.

The foregoing and other objects of this invention are achieved by the provision of a line of sight aligning device for use with optical instruments having a viewing opening, which device comprises a body member having an eye opening and a nose recess in operative position relative to each other. Positioning means position the body member relative to the optical instrument with its eye opening in operative position relative to the viewing opening of the optical instrument. A straight edge is positioned on the front face of the body member above the eye opening and the recess, but within the field of vision of the viewer. The straight edge is disposed substantially at right angles to the longitudinal axis of the nose recessed in the body member.

A pad adapted to serve as a head rest is mounted on the front face of the body member. It preferably is integral with the straight edge.

By inserting his nose in the nose recess, looking into the eye opening, and simultaneously positioning his head in such a position that the longitudinal axis of his nose intersects the straight edge at right angles, precise alignment of his line of sight with whatever instrument is associated with the device is assured.

THE DRAWINGS

In the drawings:

FIG. 1 is a perspective view illustrating the manner of application of the herein described line of sight aligning device to an optical instrument requiring precise line of sight alignment.

FIG. 2 is an exploded view of the device, illustrating its parts and its manner of attachment to the optical instrument.

FIG. 3 is a transverse sectional view of the device.

FIG. 4 is a view in front elevation of the device.

DESCRIPTION OF A SPECIFIC EMBODIMENT OF THE INVENTION

As shown in FIGS. 1 and 2, the device of the invention, illustrated generally at 10, is applied to an optical instrument, indicated generally at 12, for the purpose of aligning the line of sight of the viewer with respect to the instrument.

The device comprises a body member 14, which may be made of molded plastic. The body member is formed with an eye opening 16 which is placed in alignment with a component part of the optical instrument, for example with camera 18, FIG. 3.

The body of the device is shaped along its lower margin with at least one, preferably two, nose recesses 20, 22. Nose recess 20 is employed when it is desired to align the right eye with the eye opening. Nose recess 22 is employed when it is desired to align the left eye therewith.

Suitable attaching means are provided for releasably attaching the device to the instrument, and positioning it in operative position relative thereto. In the illustrated form of the invention the positioning means comprise bolts 24 which engage threaded openings, not shown, in body member 14.

The upper face portion of the body member is formed with a raised, elongated base strip 26 having elongated end sockets 28 and central socket 30. The base strip mounts a straight edge and a head rest, preferably in the illustrated form of one integral unit.

The combination straight edge and head rest indicated generally at 32 is provided with a downwardly turned lip 34 which serves as the straight edge. The body of the combination unit comprises a pad 36 which serves as a head rest, bearing against the forehead of the viewer during use of the device. The head rest and pad are somewhat elevated to position the viewer's eye a spaced distance above eye opening 16.

Unit 32 may be fabricated from a single piece of molded plastic. Since it is desirable to remove it from the device from time to time in order to clean it, or to replace it, it is provided with releasable attaching means by which it may be releasably attached to raised base 26.

In the illustrated form of the invention the releasable attaching means comprise pins 38 which releasably engage sockets 28, 30 in a press fit in pin and socket relationship. Providing end sockets 28 in elongated form permits a slight variance in the spacing between the central and end attaching pins.

Since it may be desired to include optical parts in the device, body member 14 is formed with inwardly extending, concentric, cylindrical projections forming tubes 40, 42 FIG. 3. These may be used to mount desired optical components, for example lenses 44, 46, 48 in the illustrated manner.

To use the hereindescribed combination line of sight aligning device and head rest, the viewer places his nose in the selected one of the two nose recesses 20, 22 with one or the other of his eyes above eye opening 16, and with his forehead pressing lightly against head rest 36. In this position straight edge 34 is within his field of vision, so that he is able to adjust his head to a position in which the straight edge is substantially at right angles to the longitudinal axis 50 of his nose, which is positioned in one of nose recesses 20, 22, FIG. 4.

In this manner he is able to align his line of vision accurately with the eye opening of the device as well as with the viewing opening in the associated optical instrument.

Having thus described in detail a preferred embodiment of the present invention, it will be apparent to those skilled in the art that various physical changes could be made in the device described herein without altering the inventive concepts and principles embodied. The present embodiment is therefore to be considered in all respects as illustrative and not restrictive, the scope of the invention being indicated by the appended claims rather than by the foregoing description. All changes which come within the meaning and range of equivalency of the claims are therefore to be embraced therein.

I claim:

1. For use with an optical instrument having a viewing opening requiring precise alignment with the line of sight of the viewer, a line of sight aligning device comprising:
    (a) a body member having an eye opening and a nose recess in operative position relative to each other,
    (b) positioning means on the body member for releasably securing the body member to the optical instrument with the eye opening of the body member in operative position registering with the viewing opening of the optical instrument, providing the body member with a front face and a back face, and
    (c) on the body member front face a straight edge positioned above the nose recess but within the field of vision of the viewer, and disposed substantially at right angles to the longitudinal axis of the nose recess in the body member.

2. The device of claim 1 including a pad member on the body member positioned above the nose opening and adapted to serve as a head rest.

3. The device of claim 2 wherein the straight edge comprises an integral edge of the pad member.

4. The device of claim 2 wherein the pad member is a separate piece and including means for removably attaching the piece to the body member.

5. The device of claim 4 wherein the attaching means comprise press fit pin and socket attaching means.

6. The device of claim 1 wherein the body member has two laterally spaced apart nose recesses, one on one side and the other on the other side of the eye opening, for aligning the eye opening selectively with the left eye or the right eye of the viewer.

7. The device of claim 1 including on the rear face of the body member inwardly extending lens holding means substantially aligned with the eye opening.

* * * * *